(12) United States Patent
Ursu

(10) Patent No.: US 7,850,179 B2
(45) Date of Patent: Dec. 14, 2010

(54) WHEEL ASSEMBLY

(75) Inventor: Dan S. Ursu, Windsor (CA)

(73) Assignee: Axletech International IP Holdings, LLC, Troy, MI (US)

( * ) Notice: Subject to any disclaimer, the term of this patent is extended or adjusted under 35 U.S.C. 154(b) by 0 days.

(21) Appl. No.: 12/239,174

(22) Filed: Sep. 26, 2008

(65) Prior Publication Data

US 2009/0091098 A1 Apr. 9, 2009

Related U.S. Application Data

(60) Provisional application No. 60/977,959, filed on Oct. 5, 2007.

(51) Int. Cl.
*B62D 7/18* (2006.01)
(52) U.S. Cl. .............................. 280/93.512; 280/86.751; 280/86.758
(58) Field of Classification Search ............ 280/93.512, 280/86.751, 86.754, 86.758
See application file for complete search history.

(56) References Cited

U.S. PATENT DOCUMENTS

| | | | | |
|---|---|---|---|---|
| 1,932,340 A | * | 10/1933 | Goltry | 280/93.512 |
| 3,908,480 A | * | 9/1975 | Afanador et al. | 74/511 R |
| 5,257,801 A | * | 11/1993 | Matsuzawa et al. | 280/124.138 |
| 5,435,590 A | * | 7/1995 | Larsson | 280/93.502 |
| 6,371,500 B1 | | 4/2002 | Goddard | |
| 6,588,776 B1 | | 7/2003 | Irwin | |
| 6,616,156 B1 | * | 9/2003 | Dudding et al. | 280/93.512 |
| 2004/0188969 A1 | * | 9/2004 | Huhn et al. | 280/93.512 |

* cited by examiner

*Primary Examiner*—Eirc Culbreth
(74) *Attorney, Agent, or Firm*—Howard & Howard Attorneys PLLC

(57) ABSTRACT

A wheel assembly for a vehicle includes a knuckle having an upper end and a lower end. A bracket is mounted to one of the upper end and the lower end of the knuckle by a plurality of fasteners. A ball joint is mounted to the bracket and configured for attaching the wheel assembly to the vehicle. One of the knuckle and the bracket defines a boss and the other defines a bore. The boss is slideably disposed within the bore in slip fit engagement. The boss transfers a load between the knuckle and the bracket in both a vertical direction along a king pin axis and a horizontal direction along a longitudinal axis of the vehicle.

19 Claims, 4 Drawing Sheets

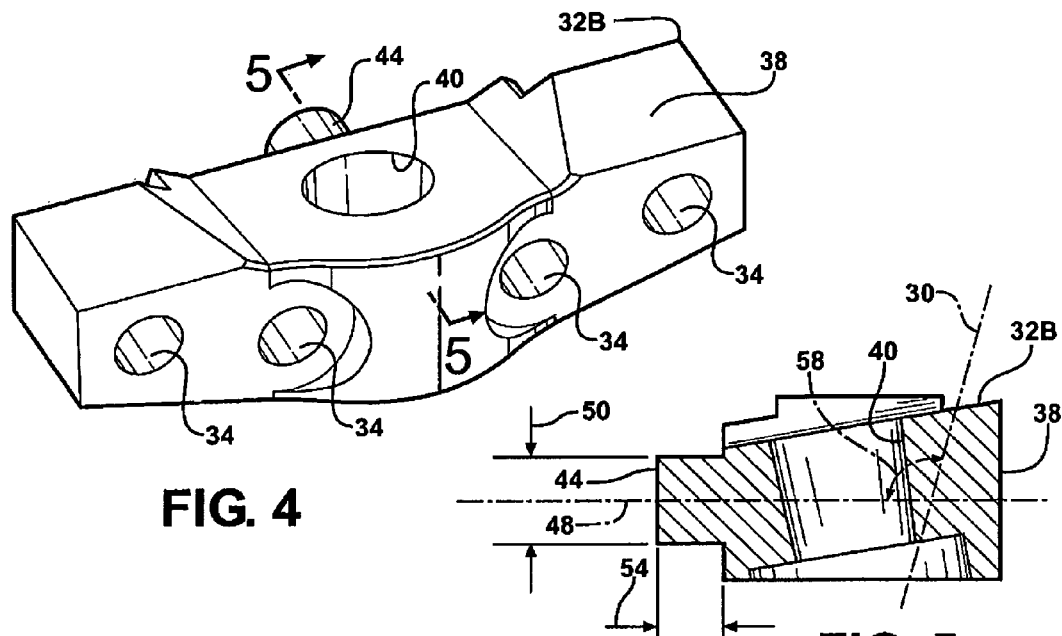
FIG. 4
FIG. 5
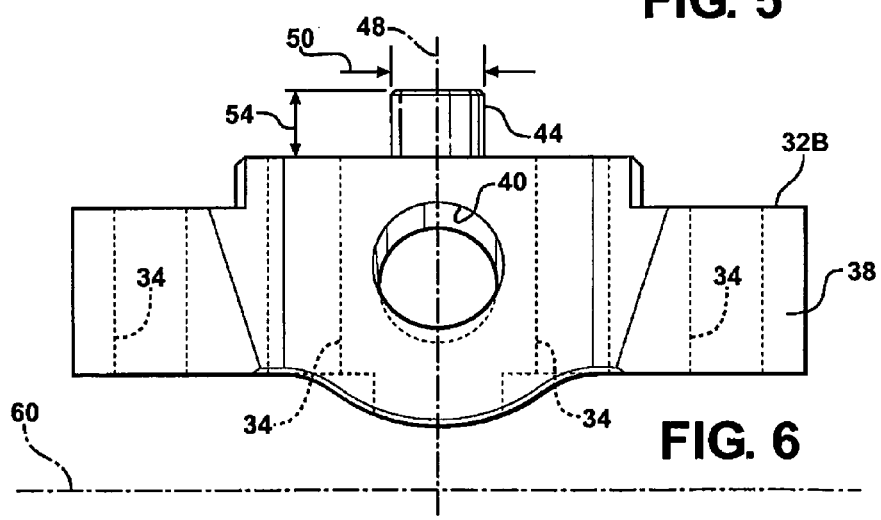
FIG. 6
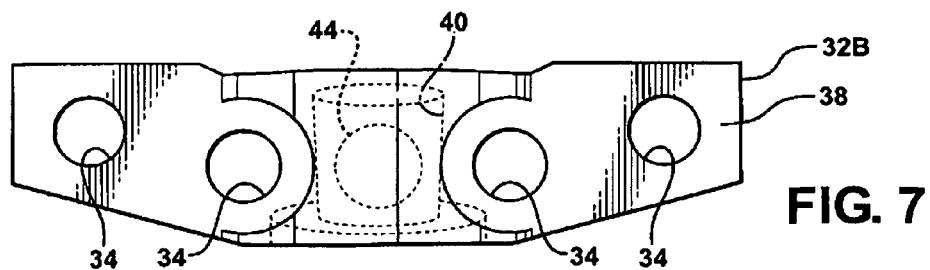
FIG. 7

US 7,850,179 B2

WHEEL ASSEMBLY

CROSS REFERENCE TO RELATED APPLICATION

This application claims the benefit of U.S. Provisional Patent Application Ser. No. 60/977,959 filed Oct. 5, 2007, the disclosure of which is hereby incorporated by reference.

BACKGROUND OF THE INVENTION

1. Field of the Invention

The subject invention generally relates to a wheel assembly for a vehicle.

2. Description of the Prior Art

Wheel assemblies generally include a knuckle. A wheel hub is rotatably supported by the knuckle. The knuckle is coupled to the vehicle by an upper ball joint and a lower ball joint. The upper ball joint and the lower ball joint are concentric with and aligned along a king pin axis. The upper ball joint and the lower ball joint may be mounted to an upper bracket and a lower bracket respectively, with the upper bracket and the lower bracket mounted to the knuckle by a plurality of fasteners, such as by bolts. Accordingly, the fasteners provide a clamping force to mount the brackets to the knuckle. Additionally, the fasteners transfer a load, i.e., a force, between the knuckle and the upper bracket and the lower bracket. This load is considerable when the wheel assembly is utilized in heavy duty vehicles, such as in commercial off-road use and in military applications.

The knuckle, the upper bracket and the lower bracket are typically manufactured from steel in order to adequately transfer the load between the knuckle and the upper and lower brackets to the fasteners connecting the upper and lower brackets to the knuckle. Having the knuckle, the upper bracket and the lower bracket manufactured from steel increases the weight of the wheel assembly, which increases the overall weight of the vehicle and thereby negatively affects fuel efficiency of the vehicle.

SUMMARY OF THE INVENTION AND ADVANTAGES

The subject invention provides a wheel assembly for a vehicle. The wheel assembly comprises a knuckle. The knuckle includes an upper end and a lower end spaced from the upper end along a king pin axis. A bracket is mounted to one of the upper end and the lower end of the knuckle. The bracket defines a king pin aperture concentric with the king pin axis. The king pin aperture receives a ball stud within the king pin aperture. One of the knuckle and the bracket defines a boss and another of the knuckle and the bracket defines a bore. The boss is in slip fit engagement within the bore. The boss transfers a load between the knuckle and the bracket vertically along the king pin axis and horizontally along a longitudinal axis of the vehicle. The longitudinal axis of the vehicle is generally transverse to the king pin axis.

Accordingly, the wheel assembly of the subject invention utilizes the boss to transfer the load, i.e., a force between the knuckle and the bracket. The use of the boss to transfer the load between the knuckle and the bracket permits the knuckle to be manufactured from a lightweight material, such as aluminum, thereby reducing the weight of the wheel assembly. Furthermore, the boss reduces the load transferred between the knuckle and the bracket by a plurality of fasteners interconnecting the knuckle and the bracket, which improves a clamping force applied by the fasteners to the knuckle and the bracket.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of a bracket of the wheel assembly;
FIG. 5 is a cross sectional view of the bracket along cut line 5-5 shown in FIG. 4;
FIG. 6 is a top plan view of the bracket;
and
FIG. 7 is a front plan view of the bracket.

DETAILED DESCRIPTION OF THE INVENTION

Referring to the Figures, wherein like numerals indicate corresponding parts throughout the several views, a wheel assembly is shown generally at 20. The wheel assembly 20 is for a vehicle and rotatably supports a wheel hub 22. A wheel (not shown) is mounted to the wheel hub 22, and a tire (not shown) is mounted to the wheel as is well known. It should be appreciated that the wheel hub 22 may include any suitable hub assembly, and specifically may include an electric drive hub assembly, a gear reduction hub assembly, or some other hub assembly particularly suited for heavy duty vehicles and/or off-highway applications. It should also be appreciated that the scope of the claims are not limited by the type and configuration of the wheel hub 22.

Figure 1:
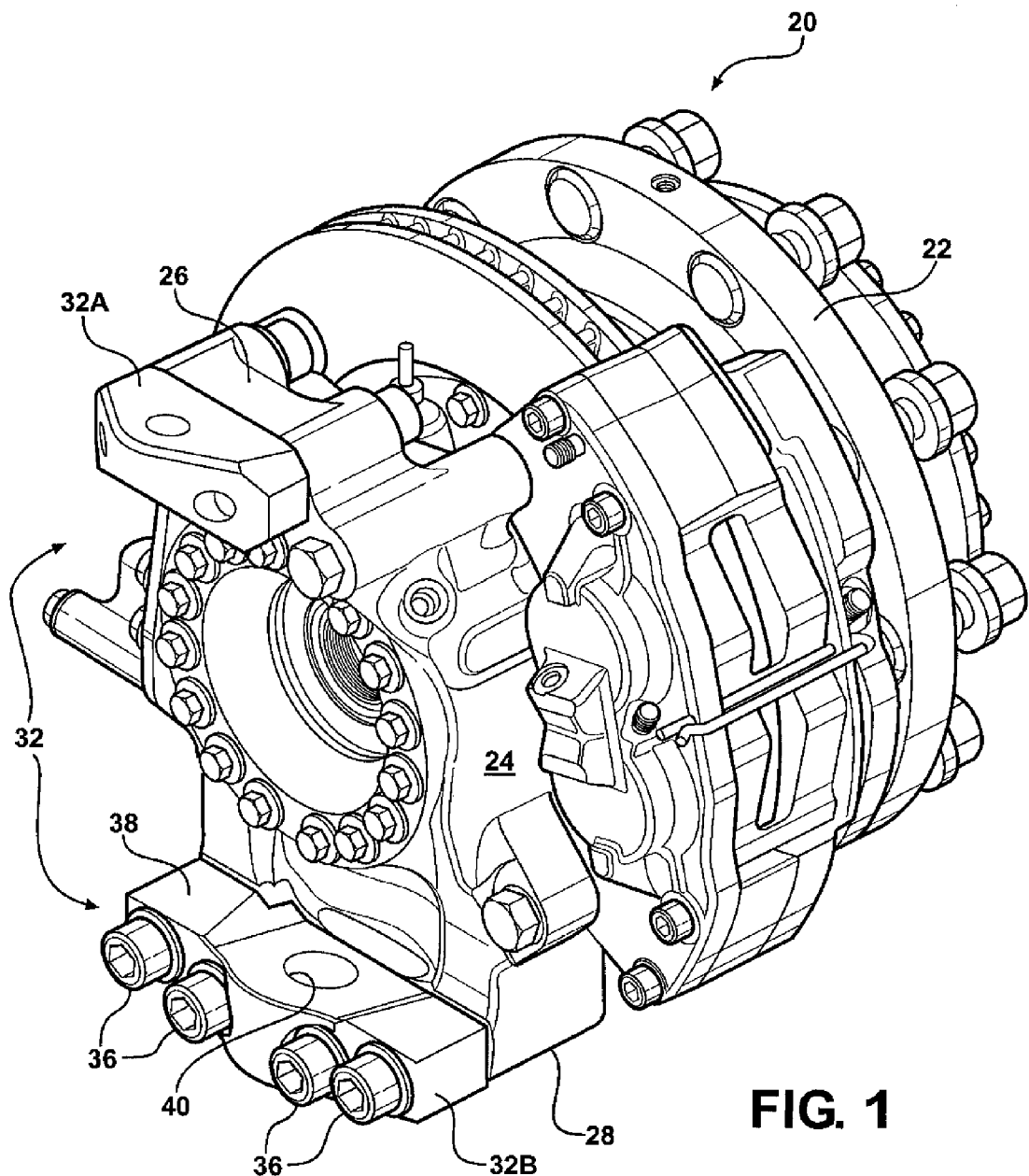
FIG. 1 is a perspective view of a wheel assembly.
Figure 2:
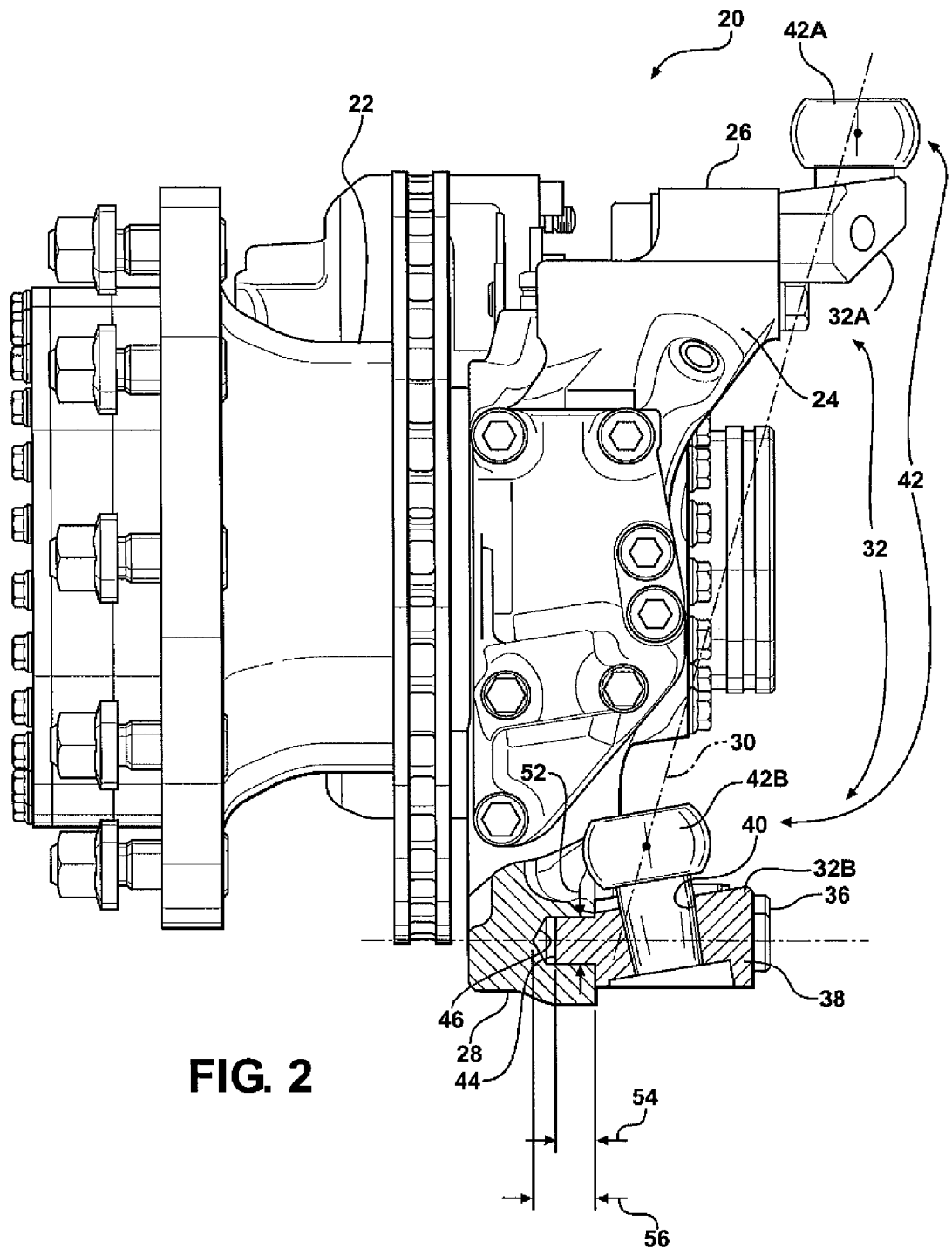
FIG. 2 is a cross sectional view of the wheel assembly.
Figure 3:
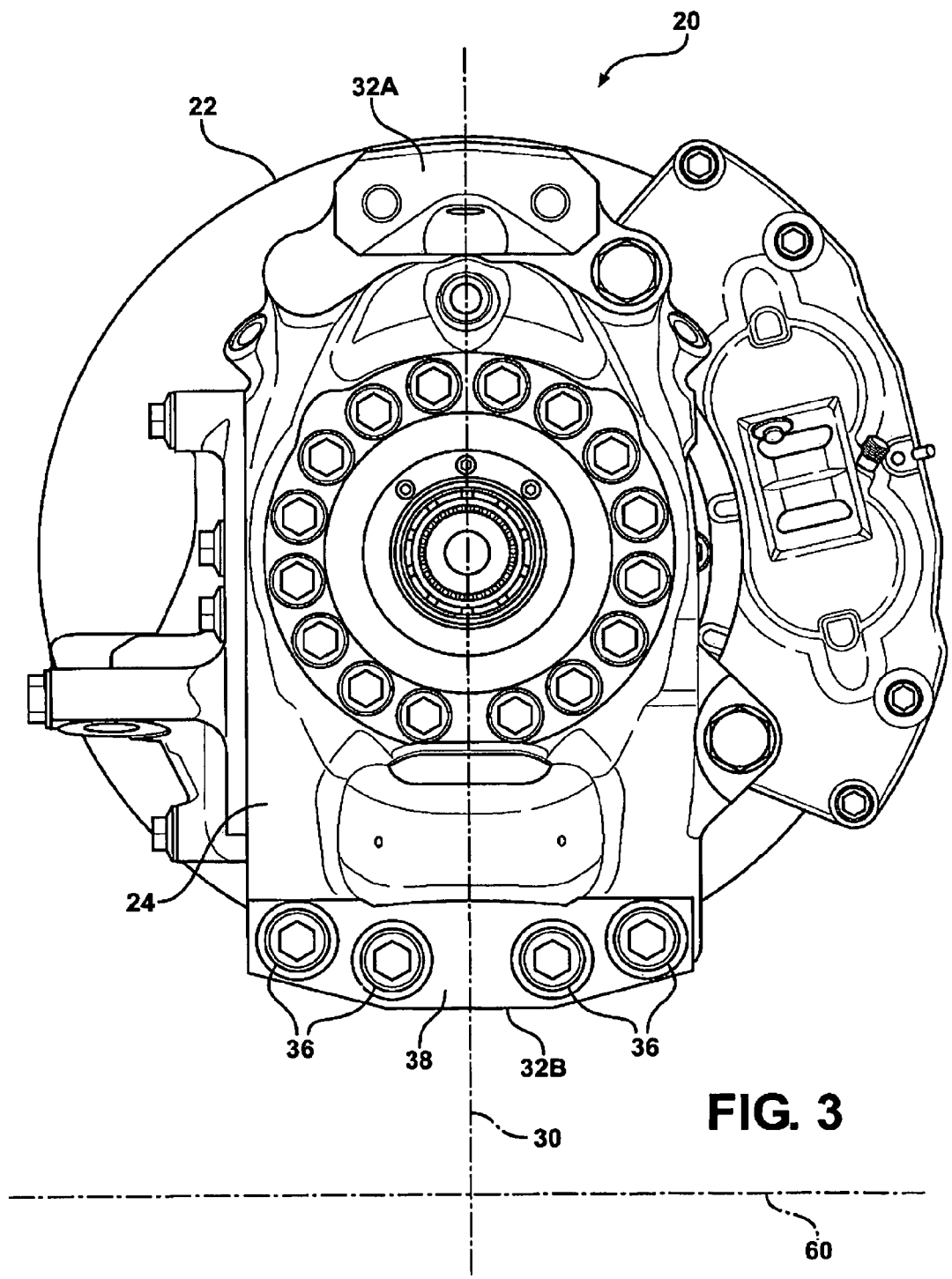
FIG. 3 is a rear plan view of the wheel assembly.

Referring to FIGS. 1 through 2, the wheel assembly 20 includes a knuckle 24. The wheel hub 22 is rotatably mounted to the knuckle 24. The knuckle 24 includes an upper end 26 and a lower end 28. The lower end 28 of the knuckle 24 is vertically spaced from the upper end 26 of the knuckle 24 along a king pin axis 30.

A bracket 32 is mounted to one of the upper end 26 and the lower end 28 of the knuckle 24. Preferably, the bracket 32 includes an upper bracket 32A mounted to the upper end 26 of the knuckle 24 and a lower bracket 32B mounted to the lower end 28 of the knuckle 24. It should be appreciated that throughout the detailed description of the subject invention, reference to "the bracket 32" describes both the upper bracket 32A and the lower bracket 32B unless otherwise noted. However, within the scope of the claims, the recited term "the bracket 32" refers to either the upper bracket 32A or the lower bracket 32B and should not be limited to require both the upper bracket 32A and the lower bracket 32B unless specifically recited.

Referring Also to FIGS. 4 through 7, the bracket 32 defines a plurality of fastener apertures 34. The fastener apertures 34 extend transverse to the king pin axis 30 and are generally perpendicular to the knuckle 24. The wheel assembly 20 further includes a plurality of fasteners 36. Each of the plurality of fasteners 36 is slideably disposed within one of the plurality of fastener apertures 34. Each of the fasteners 36 is in threaded engagement with one of the knuckle 24 and the bracket 32. As shown, the fasteners 36 are in threaded engagement with the knuckle 24. The fasteners 36 provide a clamping force to bias the knuckle 24 and the bracket 32 together.

The bracket 32 includes a body 38. The body 38 of the bracket 32 defines a king pin aperture 40. As best shown in FIG. 2, the king pin aperture 40 receives a ball stud 42 of a ball joint therein. The ball joint couples the wheel assembly 20 to the vehicle as is well known in the art. Preferably, and as shown, the wheel assembly 20 includes an upper ball stud 42A mounted to the upper bracket 32A and a lower ball stud 42B mounted to the lower bracket 32B.

One of the knuckle 24 and the bracket 32 defines a boss 44. Another of the knuckle 24 and the bracket 32 defines a bore 46. Preferably, and as best shown in FIG. 2, the bracket 32 includes the boss 44 and the knuckle 24 defines the bore 46. As shown, the boss 44 extends from the body 38 of the bracket 32 along a central axis 48. Preferably, the body 38 and the boss 44 are integrally formed. However, it should be appreciated that the boss 44 may be a separate piece from both the knuckle 24 and the bracket 32 and fixedly mounted to one of the knuckle 24 and the bracket 32.

The boss 44 is disposed within the bore 46 in slip fit engagement within the bore 46. Accordingly, the bore 46 includes a cross section defining a shape. The boss 44 also includes a cross section defining a shape complimentary to the cross sectional shape of the bore 46. The cross sectional shape of the boss 44 mates with the cross sectional shape of the bore 46 in a tight lash free engagement so as to permit load transfer therebetween in all directions radially about the central axis 48.

Preferably, and as shown, the cross sectional shape of the bore 46 and the cross sectional shape of the boss 44 include a circular cross sectional shape. The boss 44 includes a boss diameter 50 and the bore 46 includes a bore diameter 52. The bore diameter 52 is between the range of 40 microns and 120 microns larger than the boss diameter 50. Preferably, the diameter of the boss 44 is at least 20 mm. Even more preferably, the diameter of the boss 44 is at least 25 mm. While the boss 44 and the bore 46 are both shown as having a circular cross sectional shape, it should be appreciated that the cross sectional shape of the boss 44 and the cross sectional shape of the bore 46 may include shapes other than circular, such as a square cross sectional shape, a hexagonal cross sectional shape, etc.

The boss 44 extends from the knuckle 24 or the body 38 of the bracket 32 a boss length 54. The bore 46 extends into the knuckle 24 or the body 38 of the bracket 32 a bore distance 56. The bore distance 56 is greater than the boss length 54. Accordingly, an end of the boss 44 does not contact an end of the bore 46 so that any debris caught within the bore 46 does not interfere with the boss 44. As shown, the knuckle 24 defines the bore 46 and the bore distance 56 and the bracket 32 includes the boss 44, which defines the boss length 54. Preferably, the boss length 54 is at least 15 mm. Even more preferably, the boss length 54 is at least 19 mm.

As described above, the boss 44 extends from the body 38 along the central axis 48. The central axis 48 intersects the king pin axis 30 with the boss 44 concentric with the central axis 48. Preferably, the central axis 48 intersects the king pin axis 30 at a non-perpendicular angle 58 relative to the body 38 as shown in FIG. 5. The angled intersection between the central axis 48 and the king pin axis 30 allows the central axis 48, and therewith the boss 44, to extend in a generally horizontal direction with the king pin axis 30 angled away from vertical to provide a proper ride alignment for the vehicle as is well known in the art.

Preferably, the knuckle 24 is manufactured from aluminum to reduce the weight of the wheel assembly 20, with the bracket 32 being manufactured from steel to provide sufficient strength. However, it should be appreciated that the knuckle 24 may be manufactured from a material other than aluminum, such as steel; and the bracket 32 may be manufactured from a material other than steel, such as cast iron.

The boss 44 transfers a load between the knuckle 24 and the bracket 32 vertically along the king pin axis 30 and horizontally along a longitudinal axis 60 of the vehicle. The longitudinal axis 60 is generally transverse to the king pin axis 30 and extends between a front of the vehicle and a rear of the vehicle.

The vehicle includes multiple wheel assemblies 20, which transfer the weight of the vehicle, i.e., the load, to a surface, and likewise transfer a reactionary load from the surface to the vehicle. The tight lash-free fit between the boss 44 and the bore 46 transfer the load between the knuckle 24 and the bracket 32. Because the boss 44 and the bore 46 include the complimentary cross sectional shapes, the boss 44 is capable of transferring the load between the knuckle 24 and the bracket 32 in any direction extending radially outward from the central axis 48.

It should be appreciated that the magnitude of the load that may be transferred is dependent upon the shear strength of the boss 44. The shear strength of the boss 44 is dependent upon, among other factors, a material strength of the boss 44 and the cross sectional area of the boss 44 perpendicular to the central axis 48. By increasing the cross sectional area of the boss 44, the shear strength of the boss 44 increases. The boss 44 therefore increases the shear strength between the knuckle 24 and the bracket 32 beyond that provided by the fasteners 36 connecting the bracket 32 to the knuckle 24. Accordingly, if so desired, the boss 44 may be designed to transfer the entire load and the fasteners 36 may be sized to merely provide the necessary clamping force. Additionally, the boss 44 may be sized to permit use of different materials having different material strengths.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting. It is, therefore, to be understood that within the scope of the appended claims, the invention may be practiced otherwise than as specifically described.

What is claimed is:

1. A wheel assembly for a vehicle, said assembly comprising:
   a knuckle having an upper end and a lower end spaced from said upper end along a king pin axis;
   a bracket mounted to one of said upper end and said lower end of said knuckle and defining a king pin aperture concentric with said king pin axis for receiving a ball stud within said king pin aperture; and
   one of said knuckle and said bracket defining a boss and another of said knuckle and said bracket defining a bore with said boss in slip fit engagement within said bore to transfer a load between said knuckle and said bracket vertically along said king pin axis and horizontally along a longitudinal axis of the vehicle generally transverse to said king pin axis.

2. An assembly as set forth in claim 1 wherein said bore includes a cross section defining a shape and wherein said boss includes a cross section defining a shape complimentary to said cross sectional shape of said bore for mating with said cross sectional shape of said bore.

3. An assembly as set forth in claim 2 wherein said cross sectional shape of said bore and said cross sectional shape of said boss include a circular cross sectional shape.

4. An assembly as set forth in claim 1 wherein said boss includes a diameter and said bore includes a diameter between the range of 40 microns and 120 microns larger than said diameter of said boss.

5. An assembly as set forth in claim 4 wherein said diameter of said boss is at least 20 mm.

6. An assembly as set forth in claim 5 wherein said diameter of said boss is at least 25 mm.

7. An assembly as set forth in claim 1 wherein said bracket includes a body with said boss extending from said body along a central axis.

8. An assembly as set forth in claim 7 wherein said central axis intersects said king pin axis.

9. An assembly as set forth in claim 8 wherein said central axis intersects said king pin axis at a non-perpendicular angle relative to said body.

10. An assembly as set forth in claim 7 wherein said body and said boss are integrally formed.

11. An assembly as set forth in claim 7 wherein said knuckle defines said bore.

12. An assembly as set forth in claim 7 wherein said boss extends from said body of said bracket a boss length and said bore extends into said knuckle a bore distance with said bore distance greater than said boss length.

13. An assembly as set forth in claim 12 wherein said boss length is at least 15 mm.

14. An assembly as set forth in claim 13 wherein said boss length is at least 19 mm.

15. An assembly as set forth in claim 1 wherein said bracket defines a plurality of fastener apertures extending transverse to said king pin axis and generally perpendicular to said knuckle.

16. An assembly as set forth in claim 15 further comprising a plurality of fasteners with each of said plurality of fasteners slideably disposed within one of said plurality of fastener apertures and in threaded engagement with said knuckle.

17. An assembly as set forth in claim 1 wherein said knuckle is manufactured from aluminum.

18. An assembly as set forth in claim 1 wherein said bracket includes an upper bracket mounted to said upper end of said knuckle and a lower bracket mounted to said lower end of said knuckle.

19. An assembly as set forth in claim 1 further comprising a wheel hub rotatably mounted to said knuckle.

\* \* \* \* \*